(12) United States Patent
Guzik et al.

(10) Patent No.: US 7,429,857 B2
(45) Date of Patent: Sep. 30, 2008

(54) MAGNETIC HEAD AND DISK X-Y TEST ASSEMBLY WITH OPTIMIZED ARRANGEMENT FOR SKEW ANGLE

(76) Inventors: Nahum Guzik, 4183 Old Adobe Rd., Palo Alto, CA (US) 94306; Michael Christopher St. Dennis, 904 Linda Vista St., San Jose, CA (US) 95127

( * ) Notice: Subject to any disclaimer, the term of this patent is extended or adjusted under 35 U.S.C. 154(b) by 0 days.

(21) Appl. No.: 11/481,313

(22) Filed: Jul. 5, 2006

(65) Prior Publication Data

US 2007/0145971 A1   Jun. 28, 2007

Related U.S. Application Data

(62) Division of application No. 10/665,167, filed on Sep. 18, 2003, now Pat. No. 7,061,235.

(60) Provisional application No. 60/411,616, filed on Sep. 18, 2002.

(51) Int. Cl.
*G01R 33/12* (2006.01)
*G01B 21/02* (2006.01)

(52) U.S. Cl. ........................ 324/210; 360/75

(58) Field of Classification Search ............. 360/75–76, 360/77.01–77.02, 78.04, 78.12, 78.13, 110, 360/128–129, 240, 250; 324/210–213
See application file for complete search history.

(56) References Cited

U.S. PATENT DOCUMENTS

| 4,902,971 A | 2/1990 | Guzik et al. |
| 5,254,946 A | 10/1993 | Guzik |
| 5,801,531 A | 9/1998 | Viches et al. |
| 5,923,499 A | 7/1999 | Hagen |
| 6,459,260 B1 | 10/2002 | Bonin et al. |

*Primary Examiner*—Bot LeDynh
(74) *Attorney, Agent, or Firm*—Joseph M. Maraia, Esq.; Foley & Lardner LLP

(57) ABSTRACT

A magnetic head and disk tester comprises a base, a spindle for rotationally supporting a magnetic disk, a carriage for supporting a magnetic head support which carries a magnetic head with a magnetic read/write element, and a dual-stage positioning system that moves the carriage in two perpendicular directions X and Y. The magnetic head support, the magnetic head and the magnetic read/write element have a common longitudinal axis Z. The head support is positioned such that the longitudinal axis Z forms a predetermined angle between 0° and 90° with respect to the Y direction. Preferably the predetermined angle is about 45 degrees. When the head is driven from one point of an inner track to a point of an outer track, the displacement of the head along X axis is relatively large and the displacement of the head along Y axis is relatively small.

15 Claims, 5 Drawing Sheets

MAGNETIC HEAD AND DISK X-Y TEST ASSEMBLY WITH OPTIMIZED ARRANGEMENT FOR SKEW ANGLE

RELATED APPLICATION

This is a divisional application of U.S. patent application Ser. No. 10/665,167, filed on Sep. 18, 2003 now U.S. Pat. No. 7,061,235 which claims priority to U.S. Provisional Application No. 60/411,616, filed on Sep. 18, 2002, which is hereby incorporated by reference.

FIELD OF THE INVENTION

The present invention relates to magnetic recording, particularly to a magnetic head and disk tester.

BACKGROUND

A magnetic head and disk tester is an instrument that is used for testing the characteristics of magnetic heads and disks such as signal-to-noise ratio, pulse width and so on. Each tester includes two main assemblies, i.e., an electromechanical assembly that performs movements of a head assembly with respect to a disk, and an electronic assembly that is responsible for measurements, calculations, and analysis of the measured data.

In many known magnetic head and disk testers linear movements are used to achieve proper positioning of a magnetic head with respect to a magnetic disk mounted on a disk spindle. For example, the magnetic head and disk tester disclosed in U.S. Pat. No. 4,902,971 to Guzik et al. uses only one (X-axis) movement. As a result, a proper skew angle is achieved only on inner and outer tracks. On other tracks the skew angle is close but not equal to the required value.

Positioning mechanisms employing linear X-Y movements are also utilized in the field of magnetic head and disk testing, for instance in the E5013A spin stand by Agilent Technologies. These mechanisms use separate sliders on X and Y-axes. The main disadvantage of known X-Y positioning mechanism is the strict demands this method impose on the control of head moving mechanism. For instance, as explained below, it may require a complex geometrical path over which the head travels across the surface of the disk. In some situations no simple mechanical provisions exist to prevent the head from crashing into the hub of the disk spindle.

DEFINITION OF TERMS

The parameters used to characterize the head position with respect to the magnetic media (FIG. 1) are:

The track radius R is the distance between the head write/read element and the center of the disk.

The skew angle α is the angle between the head longitudinal axis and track tangential direction at head position over a magnetic head having concentric tracks.

A typical X-Y head manipulator allows for selecting two head coordinates X and Y. Thus, during head positioning one must select the values of X and Y to achieve a given R and α.

FIG. 1 shows the typical head trajectory in a prior art tester from the outer track (radius $R_1$) to the inner track (radius $R_2$) for a tester, where the skew angle at each track is equal to the skew angle in a disk drive with a rotating head loader arm.

FIG. 2 shows a typical arrangement of a prior art X-Y positioning mechanism in a two head (top and bottom) tester which maintains the head longitudinal axis parallel to the Y-axis. In the configuration of FIG. 2, top and bottom heads are tested on the same surface of the disk (note that when the bottom head is tested, the direction of disk rotation is reversed). For the top head, following equations relate head coordinates to track radius and skew angle:

$$X = X_0 + R\cos(\alpha), \text{ and}$$

$$Y = Y_0 + R\sin(\alpha),$$

where $X_0$ and $Y_0$ are the coordinates of the center of the disk. Here we assume counterclockwise rotation of the disk. The skew angle α is measured counterclockwise from the head longitudinal axis to the tangential direction of the track at head position.

One can impose a horizontal limit ($X > X_0 + S$) for the head movement to avoid hitting the hub with the head or the head-supporting arm. Here S is the minimal distance between head write/read element and the center of the disk.

In a typical case ($R_1 = 0.75"$, $R_2 = 1.75"$, $\alpha = 20°$) the range of X-movement required to follow the disk drive simulating trajectory is approximately 0.94" and the range of required Y-movement is about 0.86".

As can be seen from FIG. 2, to move the head from the top head testing area to the bottom head testing area a complex head trajectory should be used (called "proper" trajectory on FIG. 2) to bypass the spindle hub. A software error may cause choosing a wrong trajectory and crash the head and head-loading arm into the hub ("crashing" trajectory on FIG. 2)

The geometry of head movements discussed above has some fundamental disadvantages from the mechanical point of view:

A simple error in control software may cause the head and head loader arm to crash into the spindle hub. No simple mechanical protection is possible.

Long vertical (Y) movements may be not desirable due to mechanical concerns, for instance, head loader arm has to be long enough to reach across the disk.

It is accordingly an object of the present invention to provide a magnetic head and disk tester, which is simple in construction, reliable in operation, and universal in application.

It is a further objective to provide a test assembly that avoids the possibility of crashes at a head support assembly and the hub of a tester. Other advantages and features of the invention will become apparent from a consideration of the ensuing description and drawings.

SUMMARY OF THE INVENTION

The present invention effects a simple path for a head across the surface of a disk and eliminates the possibility of crashing into the hub, even when moving to an unloading position, where the head must be far from the disk.

This object is achieved by selecting an angle between the head mounted on an X-Y moving platform and the X-axis, to be not equal to 90° in such a way that X movement is mostly used to move the head across the magnetic media, and the Y movement is strictly limited so the head cannot crash into the hub even during movement to the unload position.

The head loader may carry both top and bottom heads working on different surfaces of the magnetic disk. Alternatively, a V-shaped head loader may be used to mount top and bottom heads simultaneously and test them on the same surface of the disk, for instance to facilitate testing automation. For this head loader the bottom head is mounted symmetrically to the top head with respect to the Y-axis and is moved across the magnetic media by the same movement mechanism as the top head. This way the bottom head cannot crash into the hub as well.

DESCRIPTION OF THE PREFERRED EMBODIMENT

Figure 3:
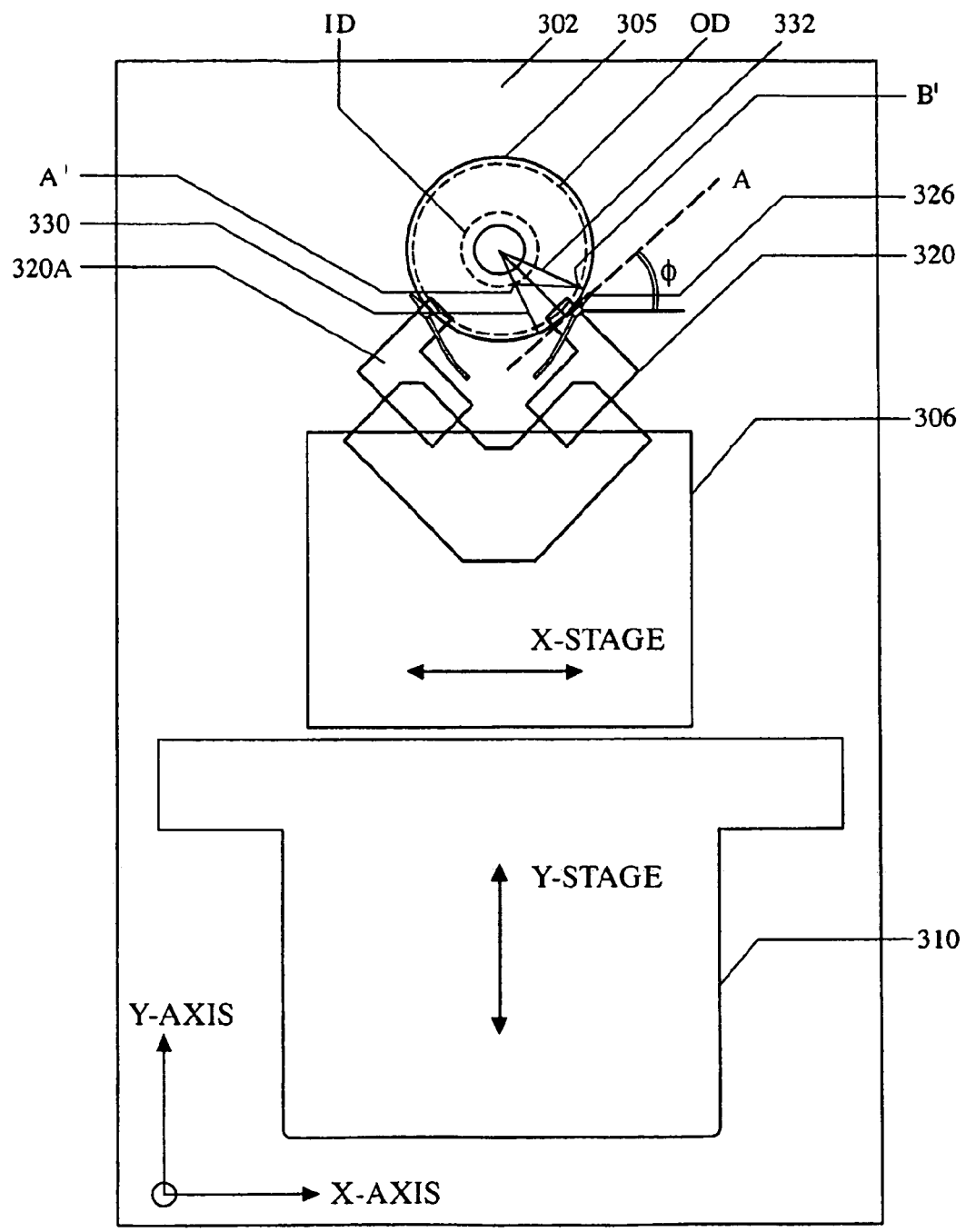
FIG. 3 is a schematic representation of a magnetic head and disk X-Y tester according to the present invention.

A preferred embodiment of the invention, tester 300, is shown in FIG. 3. The tester 300 includes a massive rigid (e.g. granite) base plate 302, referenced to an X-Y coordinate system. A magnetic disk support and spindle extend from base plate 302 and support a rotatable magnetic disk 305. The disk 305 has a plurality of concentric of magnetic data tracks between an inner diameter track ID and an outer diameter track OD. In the illustrated form, an X-direction movement stage (X-stage) 306 is coupled to base plate 302 by an air bearing (not shown), for movement in the X direction in response to an X-drive motor (not shown). A Y-direction movement stage (Y-stage) 310 is coupled to the X-stage 306 by a linear roller bearing assembly (not shown). The Y-stage 310 (and stage 306) are adapted for motion relative to base plate 302 in the Y-direction in response to a Y-drive motor (not shown). Other types of bearings for the respective stages may be used in other embodiments.

A cartridge 320 is affixed to the X-movement stage 306. A head gimbal assembly (HGA) extends from a distal end of cartridge 320, along an HGA longitudinal axis, A. The head gimbal assembly has at its distal end, a magnetic head assembly 326 with an integral read/write head.

In accordance with the invention, the HGA longitudinal axis A is angularly offset by an angle N with respect to the X axis. Preferably, the angle N is 45±20 degrees. In the illustrated embodiment, the offset angle N is 45 degrees. In FIG. 3, lines 330 and 332 respectively show the −20 degree and +20 degree skew angle limits for the head assembly 326 (points A' and B', respectively). With this configuration, to traverse from point A' to point B', it is apparent from FIG. 3 that a relatively small Y-direction motion is required. This is particularly advantageous compared with the prior art, since the relatively small required movement allows use of a smaller and less costly Y-drive assembly. Further with the offset (due to angle N), even if there were to be a failure (in software or electronics, for example), any resultant uncontrolled movement of the steps would not result in a crash into the spindle.

In the embodiment of FIG. 3, a second (optional) cartridge 320A is also affixed to the X-movement stage 306. Cartridge 320A is similar to cartridge 320, except that it is mounted with angle N' equal to −45 degrees. The arrangement with two cartridges (320 and 320A) permits testing for two heads with the same surface of the disk, while spinning the disk alternately in opposite directions.

Figure 1:
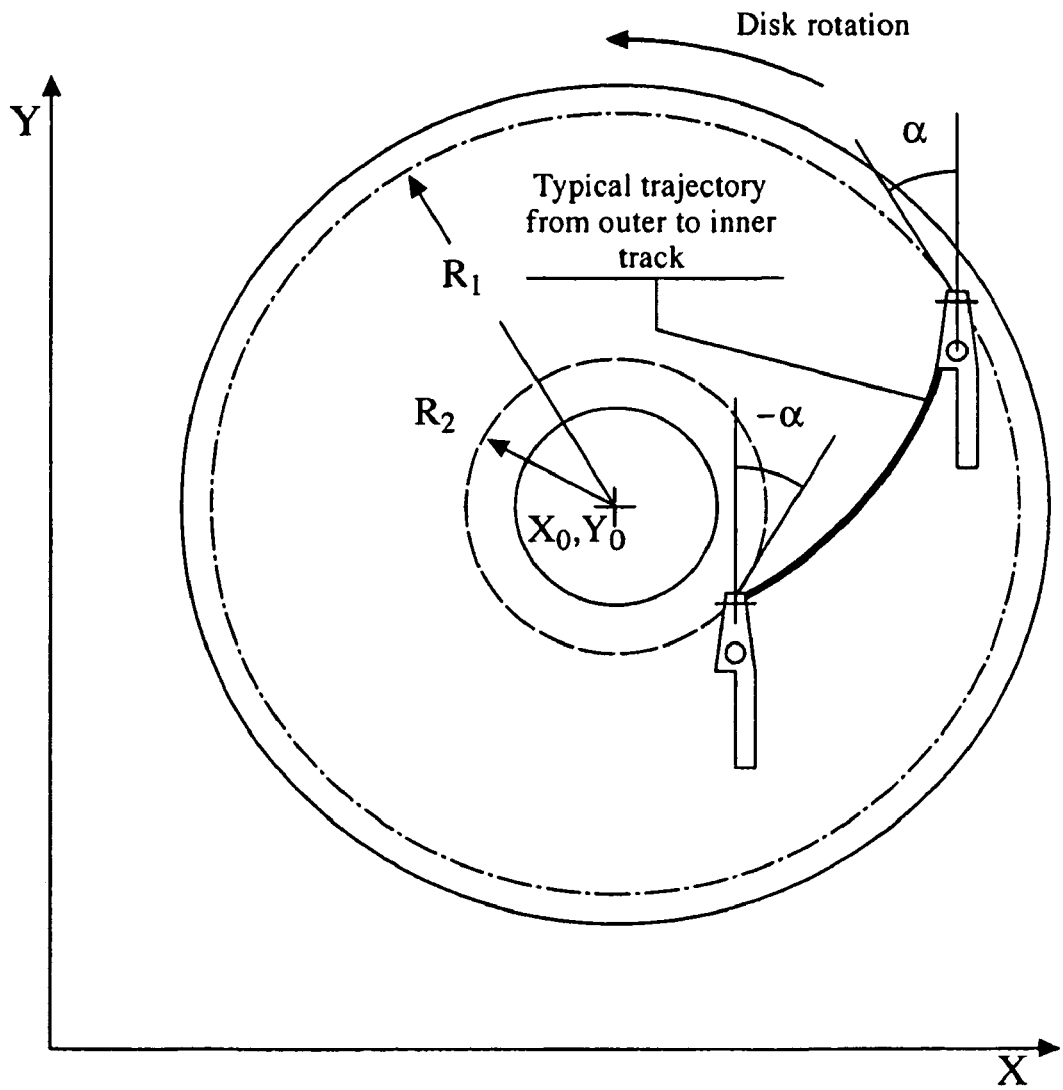
FIG. 1 is a schematic drawing showing a typical head trajectory in a prior-art head and disk tester.
Figure 2:
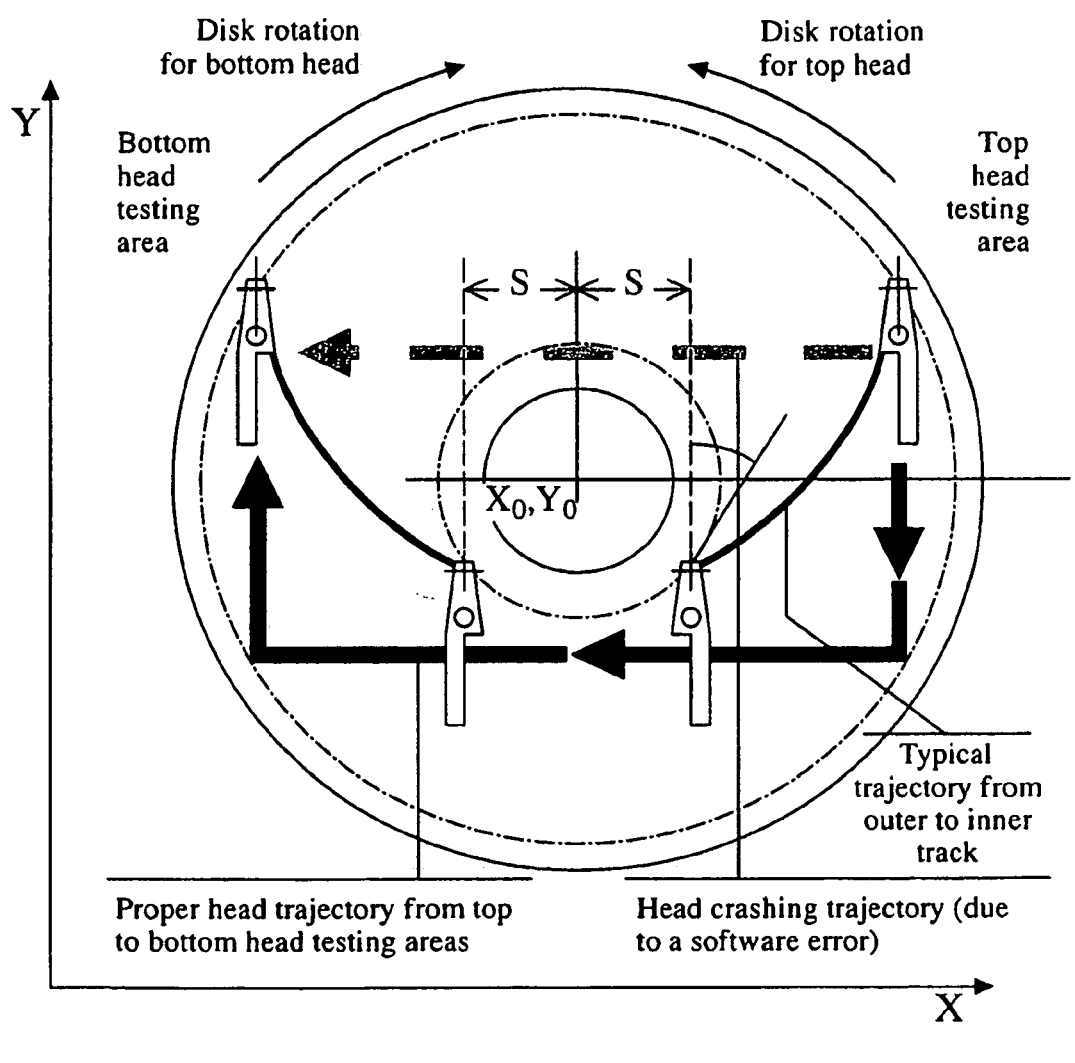
FIG. 2 is a schematic drawing of head trajectories and testing area of a prior-art magnetic head and disk tester with X-Y movement.
Figure 4:
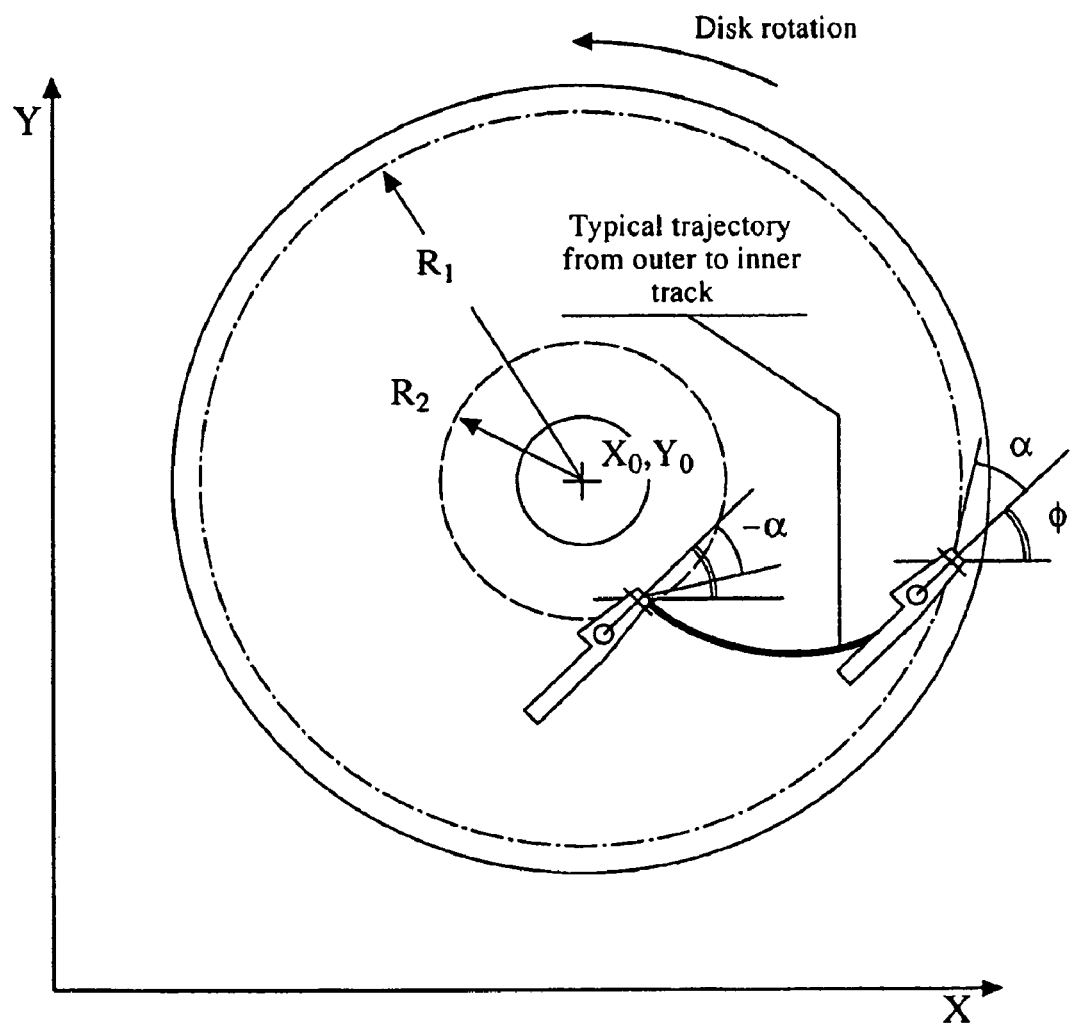
FIG. 4 is a schematic drawing showing a typical head trajectory in a head and disk tester according to the present invention.
Figure 5:
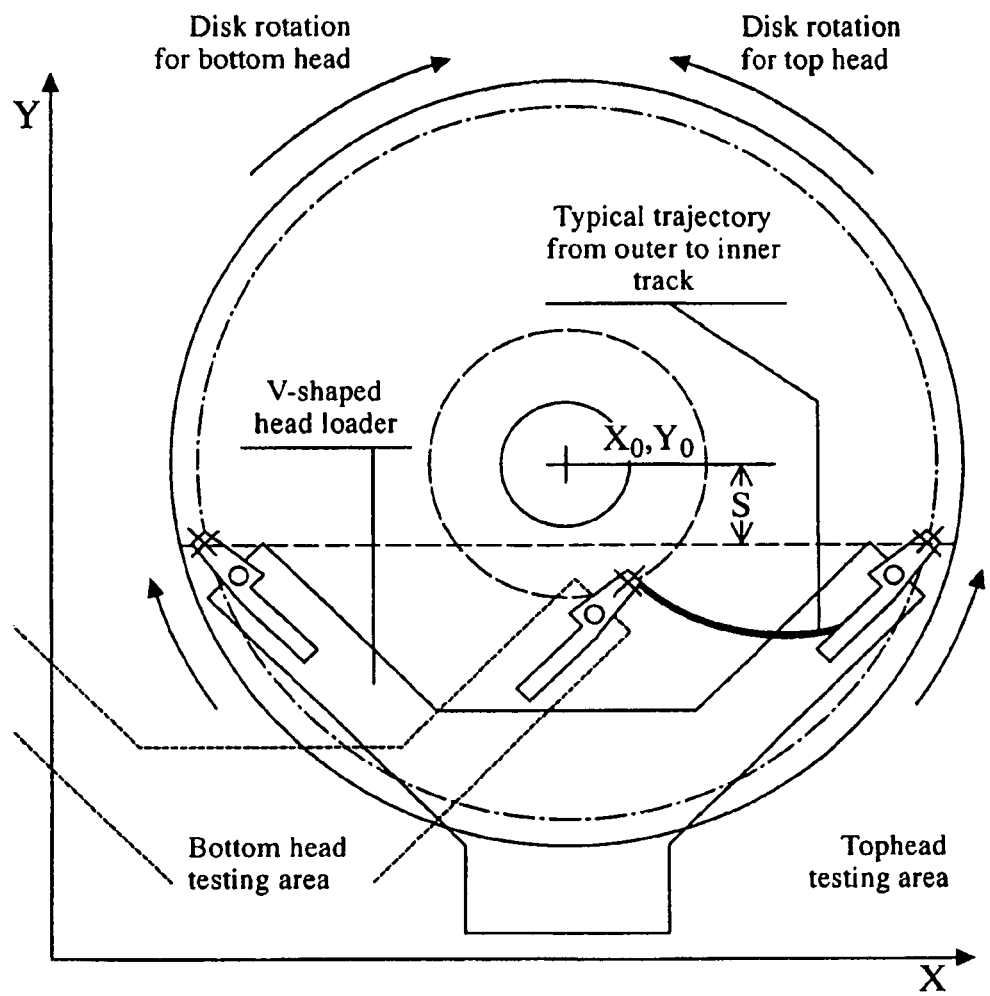
FIG. 5 is a schematic drawing of head trajectories and testing areas of a head and disk tester according to the present invention.

Thus, the present invention introduces an additional angle N between the head longitudinal axis and the direction of the X-axis (see FIG. 4). In this case, assuming counterclockwise disk rotation, the relations between head coordinates and track radius and skew angle are transformed to $X = X_0 + R \sin(N+\alpha)$, and $Y = Y0 - R \sin(N+\alpha)$ The angle N is selected between 0° and 90°, that is, N cannot be 90°). If N=90°, the head longitudinal axis would be parallel to the Y-axis and the configuration would correspond to the prior art configuration of FIG. 2.

To avoid hitting the hub we can limit the range of vertical head movements is limited to $Y < Y_0 - S$.

In typical case ($R_1$=0.75", $R_2$=1.75", N=45°, $\alpha$=20°) the range of X-movement required to follow the disk drive simulating trajectory is approximately 1.27" and the range of required Y-movement is about 0.14".

The head cannot crash into the spindle hub during any X-movement due to the limitation of Y movement noted above. Simple mechanical limiters are used to restrict the required range of X and Y-movements.

The bottom head can be tested at the opposite surface of the disk or a V-shaped head loader can be used to test top and bottom heads at the same surface of the disk (on FIG. 4 both heads are at the upper surface of the disk).

The geometry of head movements in accordance with the present invention provides the following advantages from the mechanical point of view:

There is a tradeoff between required range of vertical and horizontal movements. By changing the value of N one can narrow the range of Y-movement while possibly widening the range of X-movement. This tradeoff allows finding the optimal value of N to restrict vertical movement and completely avoid the possibility of hitting the hub while maintaining all necessary head trajectories. The X-movement range may be chosen wide enough to reach the unloading position.

A V-shaped head loader with two heads may be used to test bottom heads on the same surface of the disk (FIG. 4) with opposite directions of disk rotation. The bottom head travels across the testing area with the same X-movements as the top head and the same Y-movement restriction are used.

In the preferred form, the Y-movement range needed to simulate the skew angles in a disk drive is very small. In this case, it may be enough to approximate the required trajectory with a horizontal line and use only the X-movement, as in U.S. Pat. No. 4,902,971.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A magnetic head and disk tester, comprising:
   A. a base having a support assembly which rotatably supports a magnetic disk, said disk rotatable about an axis of rotation A;
   B. a movable carriage supported by said base, said carriage having a magnetic head support for supporting a magnetic head with a magnetic read/write element, said magnetic head support having a longitudinal axis; and C. positioning means for moving said carriage with said magnetic head with respect to said magnetic disk along two perpendicular motion axes X and Y, wherein said longitudinal axis of the head and said X axis forms a predetermined angle between 0 degrees and 90 degrees, and wherein the ranges motion of the carriage along the X and Y axes are limited such that the magnetic head has a radial distance of closest approach S to axis of rotation A, and wherein S>0.

2. A magnetic head and disk tester according to claim 1, wherein the predetermined angle is about 45 degrees.

3. A method of moving a magnetic read/write head across a magnetic disk so that said head and disk can be tested electrically, said magnetic head being supported by a magnetic head support which extends from a carriage, said magnetic head support having a longitudinal axis, said method comprising:

rotationally supporting said disk on a stationary base, said disk rotatable about an axis of rotation A;

installing said carriage onto a coordinate system, wherein said carriage is movable on said coordinate system in a two perpendicular directions X and Y, and wherein said magnetic head support and said magnetic head is positioned such that said longitudinal axis of said magnetic head support forms a predetermined angle with respect to said X direction between 0 degrees and 90 degrees, wherein the ranges of motion of the carriage along the X and Y directions are limited such that the magnetic head has a radial distance of closest approach S to axis of rotation A, and wherein S>0; and driving said carriage in said two directions such that said magnetic head traverses across said disk.

4. A method of moving a magnetic read/write head across a magnetic disk according to claim 3, wherein said predetermined angle is about 45 degrees.

5. A magnetic head and disk tester for placing a magnetic read/write head across a magnetic disk so that said head and disk can be tested electrically, said magnetic disk is rotatably supported by a spindle and rotatable about an axis of rotation A, said head and disk tester comprising:

a magnetic head support for supporting a magnetic head with a magnetic read/write element, said magnetic head support having a longitudinal axis;

a magnetic head support for supporting a magnetic head with a magnetic read/write element, said magnetic head support having a longitudinal axis; and an X-Y moving platform for supporting and moving said magnetic head support in two perpendicular directions X and Y, wherein said magnetic head support is mounted to said X-Y moving platform such that said longitudinal axis forms a predetermined angle with the X direction, wherein the angle between the longitudinal axis and the X direction is between 0 degrees and 90 degrees, wherein the ranges of motion of the carriage along the X and Y directions are limited such that the magnetic head has a radial distance of closest approach S to axis of rotation A, and wherein S>0.

6. The magnetic head and disk tester of claim 5 comprising a V-shaped head loader installed on the X-Y moving platform, wherein said magnetic head support is mounted on one side arm of said V-shaped head loader, and wherein said tester further comprises another magnetic head support for supporting another magnetic head, said another magnetic head support being mounted on the other side arm of said V-shaped head loader.

7. The magnetic head and disk tester of claim 5, wherein said tester further comprising mechanical limiters, and wherein X and Y movements of said magnetic head are limited by said mechanical limiters.

8. The magnetic head and disk tester of claim 5, wherein said tester further comprises a head loader, wherein said head loader comprises two of said magnetic head supports for placing two magnetic heads at both surfaces of the disk.

9. The magnetic head and disk tester of claim 5, wherein the angle between the head longitudinal axis and the X-axis is chosen in such a way that substantially no Y movement is used to achieve required skew angles.

10. The magnetic head and disk tester of claim 5, wherein X movement range of said magnetic head is wide enough to reach unload positions away from the disk without the possibility to crash the head and the magnetic head support into the spindle.

11. The magnetic head and disk tester of claim 1, said tester further comprising mechanical limiters, and wherein the ranges of motion of the carriage along the X and Y directions are limited by said mechanical limiters.

12. The magnetic head and disk tester of claim 11, wherein the support comprises a spindle rotatable about axis A and adapted to receive the disk and wherein X and Y movement ranges of said magnetic head are limited in such a way that said head is not able to crash into the spindle.

13. The method of claim 3, further comprising: mechanically limiting the ranges of motion of the carriage along the X and Y direction.

14. The method of claim 13, wherein the rotationally supporting said disk comprises supporting said disk on a spindle rotatable about axis A, and comprising limiting X and Y movement ranges of said magnetic head in such a way that said head is not able to crash into the spindle.

15. The magnetic head and disk tester of claim 7, wherein X and Y movement ranges of said magnetic head are limited in such a way that said head is not able to crash into the spindle.

* * * * *